June 22, 1954  J. ROSAN  2,681,818
AXIAL SCREW ADJUSTMENT MOUNTING UNIT
Filed Nov. 12, 1949  2 Sheets-Sheet 1

JOSEPH ROSAN
INVENTOR.

BY
ATTORNEY.

June 22, 1954
J. ROSAN
2,681,818
AXIAL SCREW ADJUSTMENT MOUNTING UNIT
Filed Nov. 12, 1949
2 Sheets-Sheet 2
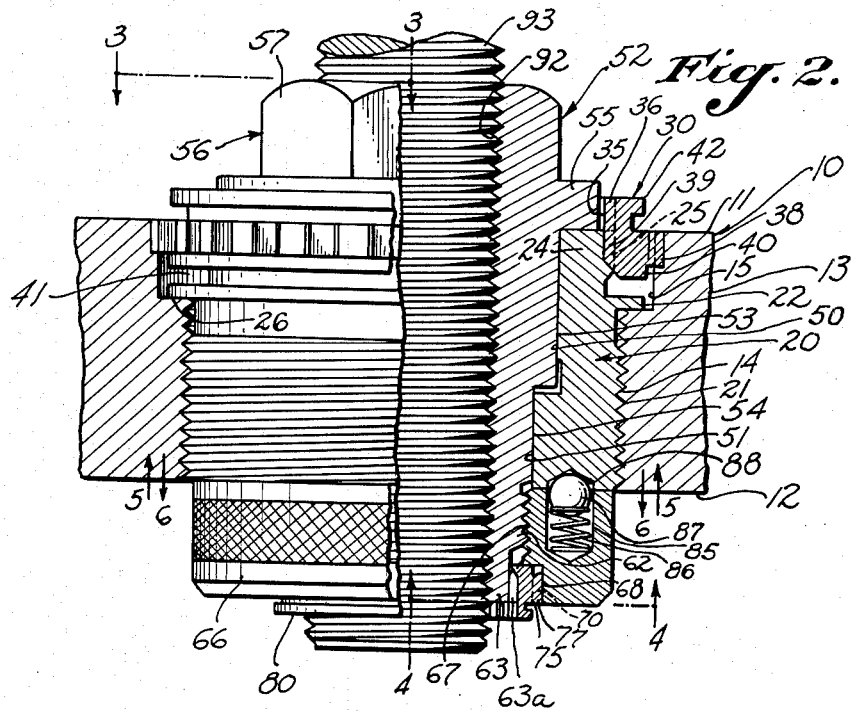
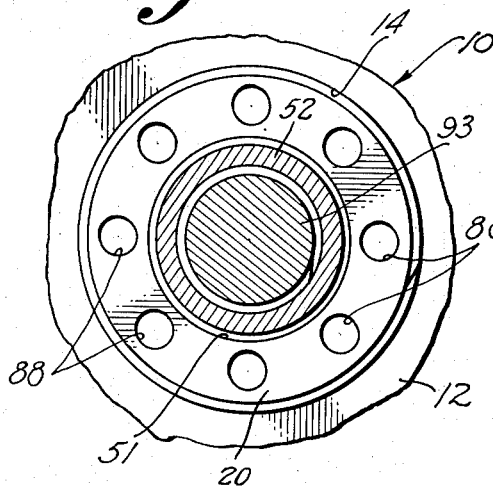
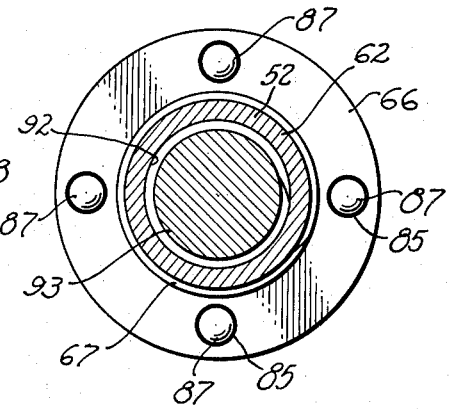
JOSEPH ROSAN
INVENTOR.
BY
ATTORNEY Patented June 22, 1954

2,681,818

UNITED STATES PATENT OFFICE 2,681,818

AXIAL SCREW ADJUSTMENT MOUNTING UNIT

Joseph Rosan, Balboa Island, Calif.

Application November 12, 1949, Serial No. 126,843

4 Claims. (Cl. 287—62)

This invention deals generally with axially adjustable screw mounting units, particularly of the type providing a unit readily insertable in a structural mounting body and comprising precision means for mounting a screw member for axial adjustment relative to the structural body and including means for locking the member in adjusted position.

A primary object of the invention is the provision of an improved mounting unit for an axially adjustable screw member, capable of being readily inserted in a structural mounting body, and incorporating means for precision axial adjustment of the screw member, as well as with means assuring maintenance of the adjusted position of the screw during service.

The invention, as well as various additional objects thereof, and its various features and advantages, will be best understood from the ensuing description of a present preferred illustrative embodiment thereof, it being understood that this typical application of the invention is merely illustrative and does not constitute any limitation on the field of use of the invention. Reference is made throughout the description to the accompanying drawings, wherein:

Figure 2 is a partial vertical medial section through the mounting unit of the invention, mounted in the structural mounting body;

Figure 5 is a bottom plan view of the insert barrel looking in the direction of the arrows 5—5 of Figure 2; and Figure 6 is a transverse section taken on line 6—6 of Figure 2.

Figure 1:
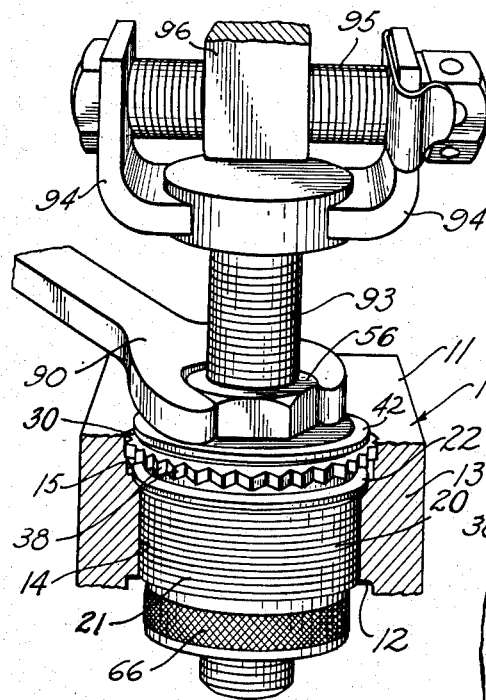
Figure 1 is a perspective view of the unit of the invention shown mounted in place in a structural mounting body, which is broken away to show in vertical medial section.
Figure 3:
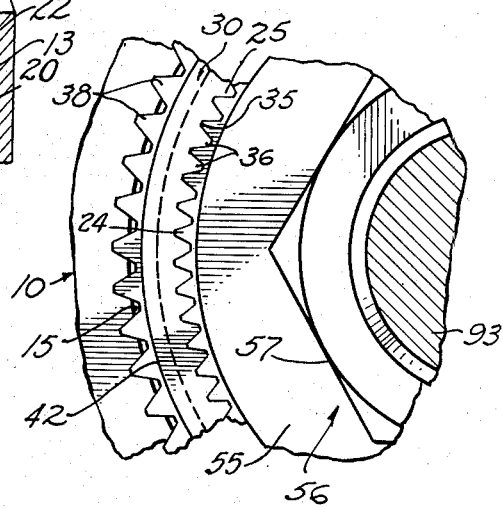
Figure 3 is a fragmentary top plan view of the mounting unit, taken along the line 3—3 of Figure 2, the axially adjustable screw or threaded shaft member appearing in section.

Referring now to the drawings, numeral 10 designates generally a structural mounting body. This mounting body 10, which is normally of some readily workable material such as aluminum alloy, has upper or outer surface 11, and lower or inner surface 12, forming the sides of a rigid stationary wall 13 into which the mounting unit is to be installed. The wall 13 is prepared for reception of the mounting unit by forming it with a screwthreaded bore 14 extending through its lower face 12, and with a relatively shallow counterbore 15 opening through surface 11.

The mounting unit includes a barrel 20, having for the major portion of its length external screwthreads 21 adapted to mate with the threaded bore 14. A means is provided for locking the barrel, once inside the bore 14, against relative rotation therein, and a preferred locking means will be described presently. In the present embodiment, these screw threads 21 extend throughout approximately the lower or inner two-thirds of the barrel. Immediately above this screwthreaded section, barrel 20 has an external outwardly extending flange 22, of a diameter to be easily received inside counterbore 15, and above said flange, the barrel is formed with a head 24, preferably and here shown to have an outside diameter just a little less than the outside diameter of its screwthreaded portion.

Head 24 is formed with external locking formations adapted to inter-engage by relative longitudinal movement with complemental locking formations formed inside a later-described locking ring. As here shown, these locking formations comprise a plurality of parallel serrations 25, disposed parallel to the axis of the insert barrel, and extending entirely around the head.

In the assembly of the mounting unit into the wall 13, this barrel 20 is screwed into socket 14 to the position shown in Figure 2, with flange 22 fitting downwardly against the upwardly facing shoulder 26 afforded at the juncture of bore 14 with counterbore 15.

The barrel 20, with the later-described parts carried thereby, is locked in position within the wall 13 by means of a locking ring 30 forming a part of the aforementioned locking means, this ring having a central opening 35 formed with locking serrations adapted to inter-engage or mesh by relatively longitudinal movement with the external locking serrations on head 24. Assuming the use of the described serrations on head 24, the locking ring is correspondingly formed with a plurality of parallel serrations 36, disposed parallel to the longitudinal axis of the ring, and extending entirely around its bore 35, and being of a size and shape complemental to the serrations 25. The locking ring 30 is thus adapted to move on over head 24 by relatively longitudinal movement, the serrations of the two members intermeshing to provide a multiple-splined connection positively preventing relative rotation between the members. The outer periphery of locking ring 30 is formed with longitudinal serrations 38 adapted to broach their way into the material of body 10 around counterbore 15 as the locking ring is driven into place around the head 24 of barrel 20, the barrel being understood to have been first screwthreaded into the bore 14 to the position shown in Figure 2. Once so driven into position, the locking ring immobilizes the barrel 20 within the body 10. The inter-engaging screwthreads on the barrel and body prevent axial displacement, while the inter-engaging serrations between the locking ring and barrel and between the locking ring and body positively prevent the slightest degree of rotation. The barrel 20 becomes in all effect an integral part of the structural body 10.

To form a means by which the locking ring may be removed once it is installed, it may, if desired, be provided on its upper side with an integral flange part 42, which, when the locking ring is home (Figure 2), is spaced somewhat above the upper face 11 of the body 10. This flange provides a part under which a prying tool may be engaged to remove the locking ring from the counterbore 15 when desired.

It will of course be understood that the locking ring 30 must be of some material harder than that of the body 10. Ordinarily, the body 10 will be a light structural alloy, usually an aluminum alloy, while the locking ring will be a hard alloy steel. However, the basic requirement is simply that the locking ring be sufficiently harder than the material of the body 10 as to permit the broaching serrations to cut their way into the said body.

A preferred locking device has now been described in some detal; it will be understood, however, that any other means for immobilizing the barrel may be substituted, if desired.

Barrel 20 has an axial bore 50 extending into it from its outer or upper end, and this bore 50 is preferably stepped down or reduced, as at 51, a short distance inward or above the inner or lower end of the barrel. A tubular post 52 is mounted for rotation inside bores 50 and 51, having a section 53 precision fitted for rotation inside bore 50, and also a reduced section 54 similarly fitted for rotation inside reduced bore 51. Above section 53 the member 52 is formed with an external annular flange 55 adapted to seat and rotate, with a precision rotating fit, on the top of the barrel head 24, and above flange 55 the member 52 has an adjustment head portion 56 provided with wrench faces 57. The head 56 is preferably hexagonal in form.

Figure 4:
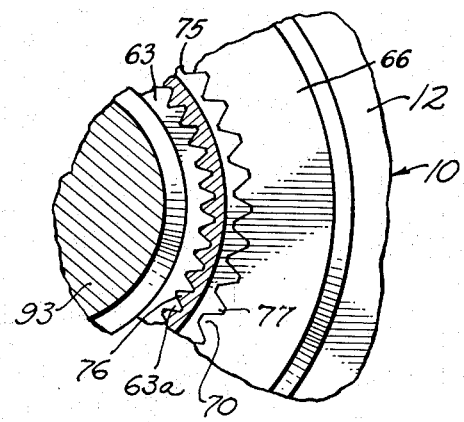
Figure 4 is a detail section taken on line 4—4 of Figure 2.

Below barrel 20, the post 52 has a short externally threaded section 62, of the same diameter as portion 54, and below threaded section 62 is a reduced serrated head portion 63, formed with serrations 63a (Figure 4) formed parallel to the axis of the post, and of the same type as were described for the head 24 of the insert barrel. A knurled, disk-like nut 66, of an external diameter just less than the diameter of the bore 14, is screwed onto the threaded, downwardly protruding portion 62 of the member 52. As illustrated, this nut 66 has a screwthreaded bore 67 extending downwardly sufficiently far to accommodate the screwthreaded part 62. Extending upwardly into the lower side of the nut 66 is a shallow counterbore 68, the latter joining with the bore 67 as shown. Around this counterbore 68, so as to face or confront the serrations 63a on member 52, are a plurality of similar parallel serrations 70 (Figure 4), and a locking ring 75 having internal parallel serrations 76 mating with the serrations 63a and external parallel serrations 77 mating with serrations 70, is forced into the counterbore 68 to lock the nut 66 to the lower end of the member 52. The fit of the serrations 77 with the serrations 70 is made tight, so as to prevent accidental displacement. Preferably, the locking ring 75 is formed with an external flange 80 by which the ring may be pried loose from its locking position.

Located in the upper face of nut member 66 are a plurality of detent ball receiving sockets 85, preferably four in number, spaced by 90°, and mounted in these sockets, above detent springs 86, are detent balls 87. These balls 87 are adapted to be received in shallower detent receiving sockets or seats 88 formed on the underside of the barrel 20, there being preferably eight of such ball sockets 88, spaced 45° apart, which cooperate with the four 90° spaced detent balls 87. It will be seen that at positions spaced 45° apart, the rotatable assembly consisting of part 52 and nut 66 will bring the four detent balls 87 carried thereby into alinement with four of the eight ball seats 88. Thus, at positions spaced 45° apart, the assembly 52, 66 is releasably locked by the four detent balls to the anchored barrel 20. Such rotation of the assembly 52, 66 is accomplished, as illustrated in Figure 1, by applying a simple and wrench 90 to the hexagonal head 56 of the member 52.

The member 52 is formed with a screwthreaded axial bore 92, in which is received a threaded shaft or lead screw member 93. It is to be understood that this threaded shaft or lead screw member may be any member whose position is to be accurately maintained in adjusted position, and whose adjustment, when necessary, must be made with extreme precision. The shaft 93 is here shown to carry a mounting yoke arm 94, which carries, in turn, a transverse lead screw member 95 on which is mounted lug 96 assumed to be directly connected to some member (not shown) whose position must be accurately adjusted.

It will be understood that the threaded shaft member 93 is held against rotation by reason of its connection with the lug 96. For vertical adjustment of the member to which said lug 96 is connected, a wrench 90, as already described, is applied to hexagonal head 56, and adjustments made through 45° increments. Assuming a shaft 93 provided with thirty-two threads to the inch, a 45° rotation of head member 56 will result in an axial travel of substantially .004" for the threaded shaft 93. Adjustment is accordingly made in increments of such order, it being understood that the mounting self-locks at every 45° position of the rotatable assembly 52, 66.

It may now be seen that the mounting barrel 20 has been securely immobilized in the structural mounting body 10, and that the rotatable adjustment assembly 52, 66 has been provided with a precision bearing on the insert barrel 20, so that rotation of the assembly 52, 66 is of a precision character. Such rotation acts through lead screw member 93 to accomplish the desired vertical adjustment of the latter through extremely small increments of travel. Adjustment may either be to the 45° spaced self-locking positions established by the engagement of the detent balls 87 with the sockets 88, or adjustments intermediate these 45° spaced positions may be made. In the latter case, however some creep may occur, but there is assurance that any such creep will be confined within 45° of travel, and the maximum creep of shaft 93 is accordingly .004".

The mounting is quickly and effectively made to the structural part 10, it being understood that the entire mounting unit, minus the locking ring 30, is first completely assembled, and that the unit is then screwed into the bore 14, after which it is locked in place by driving in locking ring 30. If it should occur that the unit must be removed for repair or inspection, this is easily accomplished by simply prying loose locking ring 39 and then unscrewing the unit from the bore 14. The removed unit may then be reassembled with the body part 10 in the same manner as before, with the exception that on this occasion, the locking ring will encounter pre-broached grooves. The engagement between the broaching serrations 38 and the pre-broached grooves will be found to be adequately tight, however, since the locking ring almost never goes back in precisely the same position as it originally occupied, and since there are inevitably minor eccentricities in the form of the ring which assure a tight fit in any event. However, as a further safeguard, a new locking ring can be employed having slightly oversized broaching serrations, giving absolutely complete assurance of as tight a fit on a subsequent installation as was accomplished at the time of the first installation.

One present illustrative form of the invention has now been described, but it will be understood that this is for illustrative purposes only, and that various changes in design, structure and arrangement may be made without departing from the spirit and scope of the invention.

I claim:

1. A mounting unit for effecting axial adjustment of a screwthreaded shaft, comprising: an internally screwthreaded sleeve adapted to receive a screwthreaded shaft for axial adjustment thereof, said sleeve having a bearing shoulder at one end and an external screwthreaded portion at its opposite end, the extremity of said opposite end having a plurality of axially directed external serrations; a body member having a full-round bearing bore journaling and confining the full perimeter of said sleeve and an end bearing face engaging said bearing shoulder, the opposite end of said body member likewise having a bearing face; a collar screwthreaded on said sleeve and forming an axially adjustable bearing shoulder coacting with the last mentioned bearing face, said collar having internal axially extending serrations at its outer end confronting the serrations of said sleeve; and a locking ring having internal and external serrations mating with the serrations of said sleeve and collar and locking said collar in predetermined adjusted bearing engagement with said body member, thereby to prevent axial displacement of said sleeve.

2. A mounting unit for effecting axial adjustment of a screwthreaded shaft, comprising: an internally screwthreaded sleeve adapted to receive a screwthreaded shaft for axial adjustment thereof, said sleeve having a bearing shoulder at one end an an external screwthreaded portion at its opposite end, the extremity of said opposite end having a plurality of axially directed external serrations; a body member having a full-round bearing bore journaling and confining the full perimeter of said sleeve and an end bearing face engaging said bearing shoulder, the opposite end of said member likewise having a bearing face; a collar screwthreaded on said sleeve and forming an axially adjustable bearing shoulder coacting with the last mentioned bearing face, said collar having internal axially extending serrations at its outer end confronting the serrations of said sleeve; a locking ring having internal and external serrations mating with the serrations of said sleeve and collar and locking said collar in predetermined adjusted bearing engagement with said body member, thereby to prevent axial displace-ment of said sleeve; the coacting bearing faces of said collar and body member having confronting sets of sockets; and yieldable detent elements in one set of sockets for engagement with the confronting set of sockets thereby to releasably hold said sleeve in a plurality of angular positions relative to said body member as said sleeve is turned to adjust said screwthreaded shaft axially.

3. For use in mounting and axially adjusting a screwthreaded shaft in a mounting body having two opposite faces and having a bore and a counterbore extending through said body between said faces, there being a shoulder at the juncture of said bore and counterbore, said counterbore having axially directed locking serrations in the wall thereof and said bore being screwthreaded, a barrel received in said bore and counterbore, said barrel having screwthreads for a portion of its length mating with the screwthreads in said bore and having at one end a head spaced from the inside wall surface of said counterbore, a positioning flange on said barrel between said head and screwthreaded portion engaged with said shoulder at the juncture of said bore and counterbore, axially directed locking serrations on said head of said barrel, a removable locking ring having internal axial serrations engaged with the serrations on said head and external axial serrations engaged with the serrations of said counterbore, whereby said barrel is immobilized in said mounting body, said barrel having at its ends oppositely facing bearing surfaces, a full round bearing bore extending axially through said barrel between said bearing surfaces, a sleeve, internally screwthreaded for engagement with said shaft, rotatably mounted in said bore in said barrel, said sleeve having near one extremity a bearing shoulder bearing on one of said barrel bearing surfaces, the opposite extremity of said sleeve projecting beyond the other of said barrel bearing surfaces, the projecting portion of said sleeve having a screwthreaded portion and an extremity having axially directed serrations beyond said screwthreaded portion, a collar screwthreaded on said screwthreaded portion and forming an axially adjustable bearing surface for co-action with the last mentioned bearing surface on said barrel, said collar having internal axially extending serrations at its outer end confronting the serrations of said sleeve, and a locking ring having internal and external serrations mating with the serrations of said sleeve and collar respectively to lock said collar in predetermined adjusted bearing engagement with the corresponding bearing surface on said barrel, whereby to prevent axial displacement of said sleeve beyond predetermined limits.

4. The subject matter of claim 3, wherein said collar has a lesser diameter than the internal diameter of said bore in said mounting body.

References Cited in the file of this patent

UNITED STATES PATENTS

| Number | Name | Date |
|---|---|---|
| 1,289,080 | Balthasar | Dec. 31, 1918 |
| 1,862,275 | Menut | June 7, 1932 |
| 1,915,486 | Frost | June 27, 1933 |
| 2,078,192 | Buhr et al. | Apr. 20, 1937 |
| 2,318,590 | Boynton | May 11, 1943 |
| 2,400,318 | Rosan | May 14, 1946 |
| 2,407,904 | Rosan | Sept. 17, 1946 |
| 2,418,396 | Carr et al. | Apr. 1, 1947 |
| 2,452,262 | Rosan | Oct. 26, 1948 |
| 2,471,403 | Benes | May 31, 1949 |